United States Patent [19]
Krouskop

[11] 3,867,498
[45] Feb. 18, 1975

[54] METHOD FOR OPENING THE CELLS OF CELLULAR CLAY BLOCKS

[75] Inventor: Ned C. Krouskop, Pittsburgh, Pa.

[73] Assignee: Pittsburgh Corning Corporation, Pittsburgh, Pa.

[22] Filed: Sept. 10, 1973

[21] Appl. No.: 395,527

[52] U.S. Cl..................... 264/88, 264/156, 264/321
[51] Int. Cl............................................. B29c 17/04
[58] Field of Search..................... 264/88, 156, 321

[56] References Cited
UNITED STATES PATENTS
2,596,659  5/1952  D'Eustachio............................ 65/22
3,087,576  4/1963  D'Eustachio...................... 181/33 R Primary Examiner—Melvyn I. Marquis
Attorney, Agent, or Firm—Stanley J. Price, Jr.

[57] ABSTRACT

Blocks formed from cellular clay can be treated to open the cells by punching a plurality of bores into the block in such manner that multiple individual clay cells are fractured during the punching process. Thereafter the punched block is subjected to fluid pressures to open passages from cell to cell within the block without otherwise breaking the structure of the block. The individual bores have a diameter from about 0.02 inch to about 1.0 inch. The bores are provided on at least two opposed sides of the block and penetrate at least one third the thickness of the block. The resulting block of cellular clay has utility as an acoustic absorber.

3 Claims, 3 Drawing Figures

PATENTED FEB 18 1975  3,867,498

METHOD FOR OPENING THE CELLS OF CELLULAR CLAY BLOCKS

BACKGROUND OF THE INVENTION

1. Field of the Invention

The present invention relates to a process for providing interconnecting cells in a block which is formed from cellular clay.

2. Description of the Prior Art

Cellular clay spherules are described in U.S. Pat. No. 2,485,724 and the method of making slabs or blocks from the clay spherules is described in U.S. Pat. No. 3,056,184. In general, cellular clay is produced by pelletizing certain natural minerals with a suitable gas generating agent and thereafter heating the pellets to generate gas bubbles which become entrapped within the mass of each individual pellet. Blocks or slabs of cellular clay are formed by filling a mold with the cellular spheres while hot and tacky so that the spheres fuse and form a slab of cellular clay. Upon cooling and annealing, the resulting block or slab acquires independent strength and can be used as thermal insulation and in other applications wherein lightweight inorganic blocks have utility.

The term "clay" is intended to encompass principally mineral materials which contain primarily silicon dioxide and and aluminum trioxide along with other naturally occurring minor ingredients such as iron oxide, calcium oxide, sodium oxide, magnesium oxide and manganese oxide. Clays have been defined, for example, as natural minerals consisting essentially of silica, alumina and alkali metal oxides.

The blocks of fused cellular clay spherules described in U.S. Pat. No. 3,056,184 have little value as acoustical insulation because of their closed cells. It is known that open-celled structures present greatly improved acoustical absorption characteristics when compared with otherwise similar closed cell structures. For example, open celled cellular glass slabs have excellent acoustical absorption properties whereas closed cell cellular glass slabs are ineffective as acoustical absorbants.

Cellular glass slabs have been treated to open a substantial portion of the individual cells by the application of fluid pressure to a slab of the cellular glass composition as described in U.S. Pat. No. 2,596,659.

When a slab or block of cellular clay having predominantly closed cells is treated with pressure in the manner taught in U.S. Pat. No. 2,596,659, the entire slab is degraded into a crumbly, structurally inadequate mass.

It is known that the acoustical absorption properties of cellular glass slabs having open-cell structures can be improved by providing plural openings such as saw slices or bores in at least one face of the structure as taught by U.S. Pat. No. 3,087,576. These elongated cavities are provided after the cellular glass slab has been treated to convert its closed cells to open cells.

SUMMARY OF THE INVENTION

According to the present invention, a method is provided for converting closed cells of cellular clay slabs into open cells to permit the use of the cellular clay slabs as acoustic absorbers. Specifically, a slab of cellular clay spherules, wherein the cells are predominately closed cells, is first treated by punching a plurality of bores into the slab. The bores preferably are distributed uniformly over each of the two opposed surfaces. Each bore has a diameter ranging from 0.02 inch to about 1 inch. The bores extend at least one third of the distance between the opposed faces of the slab. These bores are punched into the slab in such manner that all of the cells in the path of the punching tool are fractured and that the wall of each bore is lined with broken cells.

After the slab of cellular clay spherules has been punched as described, the slab can be introduced into a pressure chamber and pressurized with a suitable fluid such as high pressure air to break down the walls of the individual cells within the slab in a progressive manner and in such manner that the structure of the slab is not otherwise broken.

This permits the preparation of open celled slabs of cellular clay spherules in an economical and simple method. The resulting slab has commercially useful acoustical absorption characteristics.

DESCRIPTION OF THE PREFERRED EMBODIMENT

Figure 1:
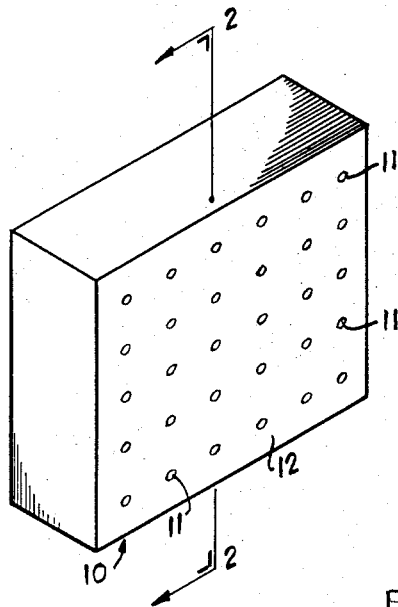
FIG. 1 is a perspective illustration of a slab of cellular clay having a plurality of bores over opposed surfaces in accordance with a first stage in this invention.
Figure 2:
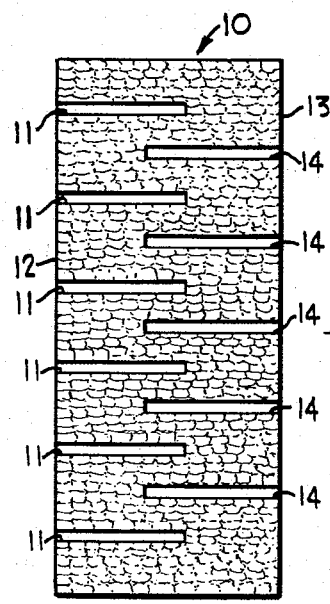
FIG. 2 is a sectional view of the block of FIG. 1 taken along the line 2—2 showing the bores of this invention.

Referring to the drawings, the block or slab 10 of cellular clay is provided with a plurality of bores 11. The bores 11 are uniformly formed in the surface 12. The opposed surface 13 also has a plurality of bores 14 uniformly formed therein.

Figure 3:
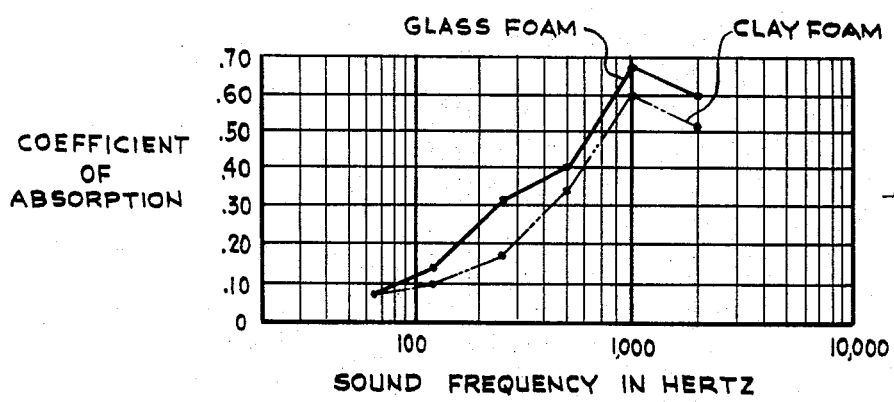
FIG. 3 is a graphical representation of the acoustical coefficient of absorption for two different substances described in the specification.

A slab of cellular clay spherules in rectangular shape was punched with a pin having a diameter of one-sixteenth inch. The punch was forced into the block on three-eighths inch centers for a distance of about one-half the thickness of the block. The pin penetration was carried out over both surfaces of the block. Thereafter the block was introduced into a pressure chamber and pressurized to at least 300 p.s.i. and preferably to 400 p.s.i. over a period of 8 to 10 minutes. The block remained at the elevated pressure for a period of 3 to 5 minutes. Thereafter, the pressure was reduced to atmospheric and the block was removed from the chamber. The resulting block was tested for acoustical absorption along with a similar block of cellular glass which had been treated by elevated pressures to open the existing closed cell structure. The coefficients of absorption of the two blocks are shown in FIG. 3 of the drawings. It will be observed that the glass block has a superior acoustical absorption coefficient at all frequencies, but that the absorption coefficient of the cellular clay slab indicates effective absorption is occurring.

According to the provisions of the patent statutes, I have explained the principle, preferred construction, and mode of operation of my invention, and have illustrated and described what I now consider to represent its best embodiment. However, it should be understood that, within the scope of the appended claims, the invention may be practiced otherwise than as specifically illustrated and described.

I claim:

1. A method for treating blocks formed from cellular clay having predominantly closed cells, said blocks having at least two opposed surfaces, which comprises punching a plurality of bores through both of said opposed surfaces in such manner that multiple closed cells are fractured during the punching process in the region occupied by each bore, said bores having a diameter from 0.02 to 1.0" and extending at least one third of the distance between the said opposed faces, thereafter applying fluid pressure to the punched block for a period sufficient to break passages from cell-to-cell within the said block without otherwise breaking down the structure of the block.

2. The method of claim 1 wherein the said fluid pressure is greater than 300 p.s.i.

3. The method of claim 1 wherein the said fluid pressure is applied as air pressure.

* * * * *